(12) United States Patent
Kalbe

(10) Patent No.: US 9,499,657 B2
(45) Date of Patent: Nov. 22, 2016

(54) BINDER FOR GRANULAR AND/OR FIBROUS SUBSTRATES

(75) Inventor: Michael Kalbe, Weinheim (DE)

(73) Assignee: BASF SE, Ludwigshafen (DE)

( * ) Notice: Subject to any disclaimer, the term of this patent is extended or adjusted under 35 U.S.C. 154(b) by 961 days.

(21) Appl. No.: 13/116,737

(22) Filed: May 26, 2011

(65) Prior Publication Data

US 2011/0294926 A1 Dec. 1, 2011

Related U.S. Application Data

(60) Provisional application No. 61/348,746, filed on May 27, 2010.

(51) Int. Cl.
| | | |
|---|---|---|
| *C08L 33/02* | (2006.01) | |
| *C08G 18/76* | (2006.01) | |
| *C08G 18/32* | (2006.01) | |
| *C08G 18/64* | (2006.01) | |
| *C08L 97/02* | (2006.01) | |
| *C08L 33/06* | (2006.01) | |
| *C08L 75/04* | (2006.01) | |

(52) U.S. Cl.
CPC ....... *C08G 18/7664* (2013.01); *C08G 18/3206* (2013.01); *C08G 18/6492* (2013.01); *C08L 97/02* (2013.01); *C08L 33/064* (2013.01); *C08L 75/04* (2013.01)

(58) Field of Classification Search
CPC .......... C08G 18/3206; C08G 18/6492; C08G 18/7664
See application file for complete search history.

(56) References Cited

U.S. PATENT DOCUMENTS

| | | |
|---|---|---|
| 3,784,396 A | 1/1974 | Fourment et al. |
| 4,076,917 A | 2/1978 | Swift et al. |
| 5,143,582 A | 9/1992 | Arkens et al. |
| 5,661,213 A | 8/1997 | Arkens et al. |
| 5,718,728 A | 2/1998 | Arkens et al. |
| 5,812,316 A | 9/1998 | Ochi et al. |
| 6,299,936 B1 | 10/2001 | Reck et al. |
| 2007/0027281 A1* | 2/2007 | Michl et al. ............... 526/318.2 |
| 2008/0233390 A1* | 9/2008 | Gothlich et al. ............. 428/336 |

FOREIGN PATENT DOCUMENTS

| | | |
|---|---|---|
| DE | 2 214 450 | 10/1972 |
| DE | 40 03 422 A1 | 8/1991 |
| EP | 0 445 578 A2 | 9/1991 |
| EP | 0 583 086 A1 | 2/1994 |
| EP | 0 651 088 A1 | 5/1995 |
| EP | 0 672 920 A1 | 9/1995 |
| JP | 05125347 A * | 5/1993 |
| WO | WO 99/09100 | 2/1999 |

OTHER PUBLICATIONS

English Translation of JP 05-125347 A; Murachi; May 1993.*
U.S. Appl. No. 13/080,879, filed Apr. 6, 2011, Michael Kalbe.

* cited by examiner

*Primary Examiner* — Karuna P Reddy
(74) *Attorney, Agent, or Firm* — Oblon, McClelland, Maier & Neustadt, L.L.P.

(57) ABSTRACT

Binder for granular and/or fibrous substrates.

15 Claims, No Drawings

BINDER FOR GRANULAR AND/OR FIBROUS SUBSTRATES

The present invention relates to a binder for granular and/or fibrous substrates, comprising as active constituents
a) a polymer obtainable by free-radical addition polymerization and comprising in polymerized form
   5% to 100% by weight of at least one ethylenically unsaturated $C_3$ to $C_6$ mono- or dicarboxylic acid (monomer A1), and
   0% to 95% by weight of at least one other ethylenically unsaturated compound which is copolymerizable with the monomers A1 (monomer A2),
   the amounts of monomers A1 and A2 adding up to 100% by weight [polymer A],
b) an organic compound comprising at least two functional groups selected from the group comprising hydroxyl, epoxy, primary amino and secondary amino groups [crosslinker B], and
c) an organic compound comprising at least two isocyanate groups [isocyanate C].

The present invention further relates to a process for producing shaped articles using granular and/or fibrous substrates and the binder, and also to the shaped articles themselves.

The consolidation of fibrous or granular substrates, more particularly in sheetlike structures, exemplified by fiber webs, fiberboards, cork boards or chipboard panels, etc., is frequently accomplished chemically using a polymeric binder. To increase the strength, particularly the wet strength and thermal stability, in many cases binders are used which comprise crosslinkers that give off formaldehyde. As a consequence of this, however, there is a risk of unwanted formaldehyde emission.

For the purpose of avoiding formaldehyde emissions there have already been numerous alternatives proposed to the binders known to date. For instance U.S. Pat. No. 4,076,917 discloses binders which comprise carboxylic acid-containing or carboxylic anhydride-containing polymers and β-hydroxyalkylamides as crosslinkers. A disadvantage is the relatively costly and inconvenient preparation of the β-hydroxyalkylamides.

EP-A 445578 discloses boards made of finely divided materials, such as glass fibers, for example, in which mixtures of high molecular weight polycarboxylic acids and polyhydric alcohols, alkanolamines, or polyfunctional amines act as binders.

EP-A 583086 discloses formaldehyde-free aqueous binders for producing fiber webs, more particularly glass fiber webs. The binders comprise a polycarboxylic acid having at least two carboxylic acid groups and also optionally anhydride groups, and a polyol. These binders require a phosphorus-containing reaction accelerant in order to attain sufficient strengths on the part of the glass fiber webs. It is noted that the presence of such a reaction accelerant is vital unless a reactive polyol is used. Highly reactive polyols specified include β-hydroxyalkylamides.

EP-A 651088 describes corresponding binders for substrates made from cellulosic fiber. These binders mandatorily comprise a phosphorus-containing reaction accelerant.

EP-A 672920 describes formaldehyde-free binding, impregnating or coating compositions which comprise at least one polyol and a polymer which is composed to an extent of 2% to 100% by weight of an ethylenically unsaturated acid or acid anhydride comonomer. The polyols are substituted triazine, triazinetrione, benzene or cyclohexyl derivatives, and the polyol radicals are always located in positions 1, 3, and 5 of the aforementioned rings. In spite of a high drying temperature, the wet tensile strengths obtained with these binders on glass fiber webs are low.

DE-A 2214450 describes a copolymer composed of 80% to 99% by weight of ethylene and 1% to 20% by weight of maleic anhydride. Together with a crosslinking agent, the copolymer is used in powder form or in dispersion in an aqueous medium for the purpose of surface coating. The crosslinking agent used is a polyalcohol which contains amino groups. In order to bring about crosslinking, however, heating must be carried out at up to 300° C.

U.S. Pat. No. 5,143,582 discloses the production of heat-resistant nonwoven-web materials using a thermosetting heat-resistant binder. The binder is formaldehyde-free and is obtained by mixing a crosslinker with a polymer containing carboxylic acid groups, carboxylic anhydride groups or carboxylic salt groups. The crosslinker is a β-hydroxyalkylamide or a polymer or copolymer thereof. The polymer crosslinkable with the β-hydroxyalkylamide is synthesized, for example, from unsaturated monocarboxylic or dicarboxylic acids, salts of unsaturated monocarboxylic or dicarboxylic acids, or unsaturated anhydrides. Self-curing polymers are obtained by copolymerizing the β-hydroxyalkylamides with monomers comprising carboxyl groups.

WO 99/09100 discloses thermally curable compositions comprising, in addition to an alkanolamine having at least two OH groups, an addition polymer 1 and a further addition polymer 2 comprising respectively ≤5% by weight and ≥15% by weight of an α,β-ethylenically unsaturated mono- or dicarboxylic acid in polymerized form, and the use of said compositions as formaldehyde-free binders in the manufacture of shaped articles.

Frequently, the shaped articles obtained using the aforementioned binders are not always fully satisfactory with regard to their mechanical properties, for example their water absorption.

In addition, a person skilled in the art will know that di- or polyisocyanates, for example polymeric diphenylmethane diisocyanate, are also useful as a formaldehyde-free binder for granular and/or fibrous substrates, more particularly cellulosic substrates, such as wood chips, wood fibers or sawdust to form wood particle board. Owing to the immense tackiness of these isocyanate compounds, the manufacture of wood particle board necessitates the use of large amounts of costly release agents, for example specific silicone oils or waxes to coat the molding press surfaces in order that safe demolding of the wood particle board obtained may be secured. In general, the release agent remaining on the surface of the wood particle board has to be sanded off in a subsequent operation.

It is an object of the present invention to provide an alternative formaldehyde-free binder system for granular and/or fibrous substrates which results in improved mechanical properties on the part of the shaped articles, more particularly wood particle board, and the use of which makes it possible to avoid or at least reduce the use of release agents in the manufacture of shaped articles.

We have found that this object is achieved by the binder system defined at the beginning.

Polymer A is obtainable by free-radical addition polymerization and comprises from 5% to 100% by weight, preferably from 70% to 100% by weight and more preferably from 85% to 100% by weight of at least one monomer A1 and correspondingly from 0% to 95% by weight, preferably from 0% to 30% by weight and more preferably from 0% to 15% by weight of at least one further monomer A2, other than monomer A1, in polymerized form. The total amounts of the monomers A1 and the total amounts of the monomers A2 sum to 100% by weight (total monomer quantity).

The monomers A1 comprise α,β-monoethylenically unsaturated, more particularly $C_3$ to $C_6$, preferably $C_3$ or $C_4$, mono- or dicarboxylic acids and also their fully or partially neutralized water-soluble salts, more particularly their alkali metal or ammonium salts, for example acrylic acid, methacrylic acid, ethylacrylic acid, itaconic acid, allylacetic acid, crotonic acid, vinylacetic acid, fumaric acid, maleic acid, 2-methylmaleic acid and also the ammonium, sodium or potassium salts thereof. But the monomers A1 also comprise the anhydrides of corresponding α,β-monoethylenically unsaturated dicarboxylic acids, for example maleic anhydride or 2-methylmaleic anhydride. Preferably, monomer A1 is selected from the group comprising acrylic acid, methacrylic acid, crotonic acid, fumaric acid, maleic acid, maleic anhydride, 2-methylmaleic acid and itaconic acid, of which acrylic acid, methacrylic acid, maleic acid, maleic anhydride and/or itaconic acid are particularly preferred.

Useful monomers A2 include all ethylenically unsaturated monomers that differ from the monomers A1 and are copolymerizable therewith. Useful monomers A2 include, for example, vinylaromatic compounds, such as styrene, α-methylstyrene, o-chlorostyrene or vinyltoluenes, vinyl halides, such as vinyl chloride or vinylidene chloride, esters of vinyl alcohol and $C_1$ to $C_{18}$ and preferably $C_2$ to $C_{12}$ monocarboxylic acids, such as vinyl acetate, vinyl propionate, vinyl n-butyrate, vinyl laurate and vinyl stearate, $C_1$ to $C_{12}$ alkyl vinyl ethers, such as methyl vinyl ether, ethyl vinyl ether, n-propyl vinyl ether, n-butyl vinyl ether, n-pentyl vinyl ether, n-hexyl vinyl ether, esters of preferably $C_3$ to $C_6$ α,β-monoethylenically unsaturated mono- and dicarboxylic acids, more particularly acrylic acid, methacrylic acid, maleic acid, fumaric acid and itaconic acid with generally $C_1$ to $C_{12}$, preferably $C_1$ to $C_8$ and more particularly $C_1$ to $C_4$ alkanols, particularly methyl acrylate, ethyl acrylate, n-butyl acrylate, isobutyl acrylate, pentyl acrylate, hexyl acrylate, heptyl acrylate, octyl acrylate, nonyl acrylate, decyl acrylate, 2-ethylhexyl acrylate, methyl methacrylate, ethyl methacrylate, n-butyl methacrylate, isobutyl methacrylate, pentyl methacrylate, hexyl methacrylate, heptyl methacrylate, octyl methacrylate, nonyl methacrylate, decyl methacrylate, 2-ethylhexyl methacrylate, dimethyl fumurate, di-n-butyl fumarate, dimethyl maleate, di-n-butyl maleate, nitriles of α,β-monoethylenically unsaturated carboxylic acids, such as acrylonitrile, methacrylonitrile, fumaronitrile, maleonitrile and also $C_{4-8}$ conjugated dienes, such as 1,3-butadiene (butadiene) and isoprene. The aforementioned monomers are generally 50% by weight, preferably ≥80% by weight and more preferably ≥90% by weight of the total amount of all monomers A2. At 25° C. and atmospheric pressure (1 atm=1.013 bar absolute) these monomers generally have a moderate to low solubility, i.e., ≤10 g, preferably ≤5 g and more preferably ≤2 g per 100 g of deionized water.

Useful monomers A2 further include a minor proportion of such ethylenically unsaturated monomers as comprise either at least one sulfonic acid group and/or its corresponding anion, or at least one amino, amido, ureido or N-heterocyclic group and/or the ammonium derivatives thereof that are alkylated or protonated at the nitrogen. Examples are acrylamide and methacrylamide, moreover vinylsulfonic acid, 2-acrylamido-2-methylpropanesulfonic acid, styrenesulfonic acid and their water-soluble salts and also N-vinylpyrrolidone, 2-vinylpyridine, 4-vinylpyridine, 2-vinylimidazole, 2-(N,N-dimethylamino)ethyl acrylate, 2-(N, N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolin-2-onyl)ethyl methacrylate. The aforementioned monomers A2 are generally used in amounts ≤10% by weight, preferably ≤8% by weight and more preferably ≤5% by weight, all based on the total amount of monomers A2.

Monomers A2 which typically enhance the integrity of films formed by a polymer matrix normally comprise at least one hydroxyl group, at least one epoxy group, at least one carbonyl group or at least two nonconjugated ethylenically unsaturated double bonds. Examples thereof are monomers comprising two vinyl radicals, monomers comprising two vinylidene radicals and also monomers comprising two alkenyl radicals. Of particular advantage here are the diesters of dihydric alcohols with α,β-monoethylenically unsaturated monocarboxylic acids, among which acrylic acid and methacrylic acid are preferred. Examples of such monomers comprising two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate and also hydroxyalkyl acrylates or methacrylates, more particularly 2-hydroxyethyl acrylate, 2-hydroxyethyl methacrylate, 2-hydroxypropyl acrylate, 2-hydroxypropyl methacrylate, 4-hydroxybutyl acrylate or 4-hydroxybutyl methacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, triallyl isocyanurate, glycidyl acrylate or glycidyl methacrylate. The aforementioned monomers A2 are generally used in amounts ≤10% by weight, preferably ≤5% by weight and more preferably ≤2% by weight, all based on the total amount of monomers A2. Preferably, the polymers A do not contain any such monomers in polymerized form.

Preferably, monomer A2 is selected from the group comprising methyl acrylate, ethyl acrylate, n-butyl acrylate, 2-ethylhexyl acrylate, methyl methacrylate and/or styrene.

In a preferred embodiment, the polymer A is constructed in polymerized form of
70% to 100% by weight of at least one monomer A1, and
0% to 30% by weight of at least one monomer A2.

In a particularly preferred embodiment, the polymer A is constructed in polymerized form of
85% to 100% by weight of acrylic acid, methacrylic acid, maleic acid, maleic anhydride and/or itaconic acid, and
0% to 15% by weight of methyl acrylate, ethyl acrylate, n-butyl acrylate, 2-ethyl hexyl acrylate, methyl methacrylate and/or styrene.

Preparing the polymers A is familiar to a person skilled in the art and is effected for example by free-radical addition polymerization of the monomers A1 and A2 according to the method of bulk, emulsion, solution, precipitation or suspension polymerization (see also the preparation of the corresponding polymers in WO 99/09100 page 5 line 12 to page 13 line 7). Depending on the monomer composition, however, polymer A is preferably prepared by free-radically initiated aqueous emulsion or solution polymerization. It is therefore advantageous according to the present invention to use polymer A dispersed or dissolved in an aqueous medium.

The conduct of free-radically initiated emulsion polymerizations of ethylenically unsaturated monomers in an aqueous medium has been extensively described before and therefore is well known to a person skilled in the art [cf. emulsion polymerization in Encyclopedia of Polymer Science and Engineering, Vol. 8, pages 659 ff. (1987); D. C. Blackley, in High Polymer Latices, Vol. 1, pages 35 ff. (1966); H. Warson, The Applications of Synthetic Resin Emulsions, Chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Holscher, Springer-Verlag, Berlin (1969)]. The free-radically initiated aqueous emulsion polymerization reactions are typically carried out by the ethylenically unsaturated monomers being dispersed, by means of dispersants, in the aqueous medium in the form of monomer droplets and polymerized by means of a free-radical polymerization initiator. The method of free-radically initiated emulsion polymerization is advantageous to use when the mixture of the monomers A1 and A2 forms a separate phase in the aqueous medium.

By contrast, the method of free-radically initiated solution polymerization is advantageous to use when the mixture of the monomers A1 and A2 is completely soluble in the polymerization medium, more particularly in an aqueous polymerization medium.

The method of free-radically initiated solution polymerization is also familiar to a person skilled in the art and is carried out more particularly in water or in an organic solvent [see for example A. Echte, Handbuch der Technischen Polymerchemie, Chapter 6, VCH, Weinheim, 1993 or B. Vollmert, Grundriss der Makromolekularen Chemie, Volume 1, E. Vollmert Verlag, Karlsruhe, 1988; L. Kotzeva, J. Polym. Sci. A-27, 1989 (4), pages 1325ff; C. Erbil et al., Polymer 41, 2000, pages 1391ff; C. Yang, X. Lu Yun, J. Polym. Sci. 75(2), 2000, pages 327ff; M. Sen et al., Polymer 40(9), 1999, pages 913ff; F. Wang et al., Anal. Chem. 68, 1996, pages 2477ff; J. Velada et al., Macromol. Chem. and Phys. 196, 1995, pages 3171ff; J. M. Cowie, C. Haq, Br. Polym. J. 9, 1977, pages 241ff; J. Velada et al., Polymer Degradation and Stability 52, 1996, pages 273ff; A. Horta et al., Makromol. Chem., Rapid Commun. 8, 1987, pages 523ff; T. Hirano et al., J. Polym. Sci. A-38, 2000, pages 2487ff; B. E. Tate, Adv. Polymer Sci. 5, 1967, pages 214ff]. When polymer A is prepared in an organic solvent, the conclusion of the polymerization is generally followed by removal of the organic solvent to an at least partial extent, advantageously to an extent $\geq 50\%$ by weight or $\geq 90\%$ by weight and particularly advantageously completely and the polymer A is taken up in water, advantageously in deionized water. The corresponding methods are familiar to a person skilled in the art. For instance, exchanging the solvent for water may be done by the solvent being distilled off at least partially, advantageously completely in one or more stages, for example at atmospheric pressure (1 atm absolute) or at reduced pressure (<1 atm absolute), and replaced by water. Frequently, it can be beneficial for the solvent to be removed from the solution by passing steam thereinto, and in the process to be replaced by water at the same time. This is more particularly the case when the organic solvent has a certain volatility in steam.

Polymer A advantageously has a weight average molecular weight $\geq 1000$ g/mol and $\leq 1\,000\,000$ g/mol. It is beneficial when the weight average molecular weight of polymer A is $\leq 500\,000$ g/mol and particularly advantageously $\leq 200\,000$ g/mol. It is particularly advantageous for polymer A to have a weight average molecular weight $\geq 3000$ g/mol, preferably $\geq 5000$ g/mol and more particularly $\geq 10\,000$ g/mol. Adjusting the weight average molecular weight in the course of the synthesis of polymer A is familiar to a person skilled in the art and is advantageously effected through free-radically initiated aqueous solution polymerization in the presence of free-radical chain transfer agents. Similarly, determining the weight average molecular weight is familiar to the person skilled in the art and is effected by means of gel permeation chromatography for example.

Controlled variation of monomers A1 and A2 with regard to type and quantity enables a person skilled in the art to use the present invention to prepare polymers A which have a glass transition temperature or a melting point in the range from −60 to 270° C. It is advantageous for the purposes of the present invention when the glass transition temperature of polymer A is preferably $\geq -20°$ C. and $\leq 110°$ C. and more preferably $\geq 20°$ C. and $\leq 5100°$ C.

The glass transition temperature $T_g$ is the limiting value of the glass transition temperature to which said temperature tends with increasing molecular weight, according to G. Kanig (Kolloid-Zeitschrift & Zeitschrift für Polymere, Vol. 190, p. 1 equation 1). The glass transition temperature $T_g$ herein refers to the glass transition temperature determined by differential scanning calorimetry (DSC, at 20 K/min, midpoint measurement, DIN 53765).

The so-called Fox equation enables a person skilled in the art to identify polymers A in a suitable $T_g$ range and to synthesize them in a specific manner through controlled variation of monomers A1 and A2 in terms of type and quantity.

According to Fox (T. G. Fox, Bull. Am. Phys. Soc. 1956 [Ser. II] 1, page 123 and as per Ullmann's Encyclopädie der technischen Chemie, Vol. 19, page 18, 4th edition, Verlag Chemie, Weinheim, 1980), the glass transition temperature of at most lightly crosslinked copolymers is given to good approximation by:

$$1T_g = x^1 T_g^1 + x^2 T_g^2 + \ldots x^n / T_g^n,$$

where $x^1, x^2, \ldots x^n$ are the mass fractions of the monomers $1, 2, \ldots n$ and $T_g^1, T_g^2, \ldots T_g^n$ are the glass transition temperatures, in degrees Kelvin, of the respective homopolymers of the monomers $1, 2, \ldots n$. The $T_g$ values of most homopolymers are known and they are given for example in Ullmann's Encyclopedia of Industrial Chemistry, Vol. 5, Vol. A21, page 169, VCH Weinheim, 1992; further sources of homopolymer glass transition temperatures include, for example, J. Brandrup, E. H. Immergut, Polymer Handbook, 1st Ed., J. Wiley, New York 1966, $2^{nd}$ Ed. J. Wiley, New York 1975, and $3^{rd}$ Ed. J. Wiley, New York 1989).

The aqueous addition polymer dispersions or solutions used according to the present invention typically have polymer A solids contents of $\geq 10\%$ and $\leq 70\%$ by weight, frequently $\geq 20\%$ and $\leq 65\%$ by weight and often $\geq 40\%$ and $\leq 60\%$ by weight, all based on the aqueous addition polymer dispersion or, respectively, aqueous addition polymer solution. The number average particle diameter determined via quasi-elastic light scattering (ISO standard 13321) in the case of addition polymers A obtained in an emulsion polymerization (cumulant z-average) is generally between 10 and 2000 nm, advantageously between 20 and 1000 nm and more advantageously between 50 and 700 nm or 80 to 400 nm.

Crosslinker B in the present invention may in principle comprise any organic compound that has at least two functional groups selected from the group comprising hydroxyl, epoxy, primary amino and secondary amino groups. According to the present invention, the average molecular weight of crosslinker B can be >1000 g/mol, although preference is given to crosslinkers B having an average molecular weight ≤1000 g/mol.

Examples of crosslinkers B having an average molecular weight >1000 g/mol are polyethylene glycols, polypropylene glycols, polytetramethylene diols, polyethylene glycol diglycidyl ethers, polypropylene glycol diglycidyl ethers, polyether amines, polyalkylene glycol diamines or polyethyleneimine diamines.

However, it is preferable according to the present invention to use crosslinkers B having an average molecular weight ≤1000 g/mol.

Particular preference is given to crosslinkers B selected from the group comprising ethanolamine, diethanolamine, triethanolamine, 3-amino-1-propanol, 1-amino-2-propanol, 5-amino-1-pentanol, 2-(2-aminoethoxy)ethanol, aminoethylethanolamine, bis(N-hydroxyethyl)-1,3-propanediamine, diisopropanolamine, triisopropanolamine, N-methyldiethanolamine, N-butyldiethanolamine, ethylene glycol, diethylene glycol, triethylene glycol, 1,2-propanediol, 1,2,3-propanetriol, 1,2-butanediol, 1,4-butanediol, 2,3-butanediol, neopentyl glycol, trimethylolpropane, 1,2-pentanediol, 1,5-pentanediol, 1,6-hexanediol, 2,5-dimethyl-2,5-hexanediol, ethylenediamine, diethylenetriamine, triethylenetetramine, propane-1,3-diamine, propane-1,2-diamine, neopentyl diamine, hexamethylenediamine, octamethylenediamine, N-(2-aminoethyl)-1,3-propanediamine, 1,2,3-propanetriamine, N,N-bis(3-aminopropyl)amine, ethylene glycol diglycidyl ether, diethylene glycol diglycidyl ether, 1,2-propylene glycol diglycidyl ether and di-1,2-propylene glycol diglycidyl ether.

Particular preference for use as crosslinker B is given to triethanolamine, diethanolamine, 1,2,3-propanetriol, 2,5-dimethyl-2,5-hexanediol, neopentyl glycol, N-(2-aminoethyl)-1,3-propanediamine, ethylene glycol diglycidyl ether and/or diethylene glycol diglycidyl ether, of which triethanolamine is particularly preferred.

Isocyanate C can be any organic compound having at least two isocyanate groups. According to the present invention, the average molecular weight of isocyanate C can be >1000 g/mol or ≤1000 g/mol, preference being frequently given to isocyanate C having an average molecular weight ≤1000 g/mol.

According to the present invention, all prior art isocyanates C can be used for preparing polyurethanes. Advantageously, however, the isocyanate C is selected from the group comprising aliphatic, cycloaliphatic and aromatic di- or polyfunctional isocyanates. It will be appreciated that the present invention shall also comprise any desired mixtures of the aforementioned isocyanates C. Preferred examples are 2,2"-, 2,4"- and 4,4"-diphenylmethane diisocyanates (MDIs), the mixtures of monomeric diphenylmethane diisocyanates and polynuclear homologs of diphenylmethane diisocyanate (PMDI), isophorone diisocyanate (IPDI) and its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

It is advantageous to use MDI, PMDI, TDI or mixtures thereof, IPDI or its oligomers, HDI or its oligomers or mixtures thereof as isocyanate C. The preferably used isocyanates may further comprise uretdione, allophanate, uretoneimine, urea, biuret, isocyanurate or iminooxadiazinetrione groups. Further possible isocyanates are indicated for example in "Kunststoffhandbuch, Band 7, Polyurethane",
Carl Hanser Verlag, 3rd edition 1993, Chapters 3.2 and 3.3.2. Isocyanate C is particularly preferably MDI and/or PMDI.

The isocyanate C used according to the present invention is advantageously used without a solvent or as a solution in an aprotic organic solvent, particular preference being given to using the isocyanate C without a solvent optionally in molten form.

The weight ratio of the total amount of polymer A to the total amount of crosslinker B in the binder of the present invention is generally in the range from 100:1 to 1:3, advantageously in the range from 20:1 to 1:2 and particularly advantageously in the range from 10:1 to 1:1 (based on solids).

The amounts of polymer A and crosslinker B are advantageously chosen such that the ratio of the number of carboxy group equivalents of polymer A to the number of hydroxyl, epoxy, primary amino and secondary amino group equivalents of crosslinker B is in the range from 100:1 to 1:5, preferably in the range from 50:1 to 1:3 and more preferably in the range from 10:1 to 1:2 (anhydride groups being reckoned as 2 carboxyl groups). It is particularly preferable for the ratio of the number of carboxyl group equivalents of polymer A to the number of hydroxyl, epoxy, primary amino and secondary amino group equivalents of crosslinker B to be in the range from 0.5 to 5.

Furthermore, in the binder of the present invention, the weight ratio of the sum total of the total amounts of polymer A and crosslinker B to the total amount of isocyanate C [(A+B):C] is generally in the range from 20:1 to 1:3, advantageously in the range from 15:1 to 1:2 and particularly advantageously in the range from 10:1 to 1:1 (based on solids).

The aforementioned binders may optionally further comprise phosphorus-containing reaction accelerants, in which case their amount is preferably ≤1.5% by weight, frequently ≤1.0% by weight, often ≤0.5% by weight and also frequently ≥0.1% by weight and often ≥0.3% by weight, based on the sum total of the total amounts of polymer A and crosslinker B (based on solids). Phosphorus-containing reaction accelerants are disclosed in EP-A 583086 and EP-A 651088 for example. They comprise particularly alkali metal hypophosphites, alkali metal phosphites, alkali metal polyphosphates, alkali metal dihydrogenphosphates, polyphosphoric acid, hypophosphoric acid, phosphoric acid, alkylphosphinic acid or oligomers/polymers of these salts and acids.

However, the aqueous binders of the present invention preferably comprise no phosphorus-containing reaction accelerant, or to be more precise, no amounts of a phosphorus-containing compound that are effective in reaction acceleration. The binders of the present invention, however, may comprise esterification catalysts familiar to a person skilled in the art, for example sulfuric acid or p-toluenesulfonic acid, or titanates or zirconates.

The aforementioned binders are very useful as binders for granular and/or fibrous substrates. The binders mentioned are therefore advantageous for use in the manufacture of shaped articles from granular and/or fibrous substrates.

Granular and/or fibrous substrates are familiar to a person skilled in the art. Examples include wood chips, wood fibers, wood flour (sawdust), cellulose fibers, textile fibers, plastics fibers, glass fibers, mineral fibers or natural fibers such as jute, flax, hemp, kenaf, curaua or sisal, but also cork chips as well as other organic or inorganic natural and/or synthetic granular and/or fibrous compounds, the longest dimension of which is ≤20 mm, preferably ≤10 mm and more particularly ≤5 mm in the case of granular substrates. It will be appreciated that the term "substrate" also comprises the fibrous webs obtainable from fibers, for example the needled (mechanically consolidated) or chemically, for example with polyvinyl alcohol, prebound fibrous webs. The binder of the present invention is advantageously useful as a formaldehyde-free binder system for granular and/or fibrous substrates comprising cellulose, more particularly lignocellulose, examples being granular and/or fibrous substrates composed of wood, straw, reed, jute, flax, hemp, kenaf, curaua, sisal and/or cork. Lignocellulose is to be understood as referring to the cellulosic structural scaffold of lignified plants (see for example the "Lignocellulose" headword in Herder-Lexikon der Biologie, Spektrum Akademischer Verlag GmbH, Heidelberg 2003).

The process for producing a shaped article from a granular and/or fibrous substrate and the aforementioned binder advantageously comprises applying the binder of the present invention to the granular and/or fibrous substrate, optionally shaping the binder-treated granular and/or fibrous substrate, and then subjecting the treated granular and/or fibrous substrate to a thermal treatment step at a temperature $\geq 100°$ C.

In an advantageous embodiment of the present invention, the binder is only obtained immediately before or during the applying to the granular and/or fibrous substrate by mixing polymer A, crosslinker B and isocyanate C or a mixture of polymer A and crosslinker B with isocyanate C. It will be appreciated that the binder is also obtainable by mixing polymer A with a mixture of crosslinker B and isocyanate C. Polymer A is advantageously used in the form of an aqueous polymer dispersion or in the form of an aqueous polymer solution. When the site for applying the binder to the granular and/or fibrous substrate is located in a mixing drum or in a mixing sector, for example, the polymer A, the crosslinker B and the isocyanate C can be metered into the mixing drum or into the mixing sector at different locations, for example in the course of the aqueous wood destructurization into the blowline between the refiner and the dryer, in which case it is particularly advantageous to dose the isocyanate C last upstream of the dryer. But it is also possible for the polymer A to be mixed, more particularly in the form of its aqueous dispersion or solution, with the crosslinker B and to add this mixture to the mixing drum or mixing sector. But it is naturally also possible for the polymer A, more particularly in the form of its aqueous dispersion or solution, the crosslinker B and the isocyanate C to be mixed in a mixing chamber, mixing nozzle or some other static or dynamic mixing device only just immediately before application to the granular and/or fibrous substrate. It is particularly advantageous according to the present invention when first polymer A and crosslinker B, or a mixture of polymer A and crosslinker B, and only thereafter in a separate step the isocyanate C are applied to the granular and/or fibrous substrate. It is frequently necessary for the granular and/or fibrous substrate which has been treated with the binder to be brought into shape, for example into the shape of continuously produced sheetlike woodbase materials and subsequently for the shape obtained with the treated granular and/or fibrous substrate to be subjected to a thermal treatment step at a temperature $\geq 100°$ C.

The treatment of the granular and/or fibrous substrates with the binder of the present invention is generally performed by the aforementioned binder being uniformly applied to the surface of the granular and/or fibrous substrates at a temperature in the range from 10 to 90° C. and advantageously in the range from 20 to 50° C. The amount of binder for this is chosen such that $\geq 0.1$ g and $\leq 100$ g, preferably $\geq 1$ g and $\leq 50$ g and more preferably $\geq 5$ g and $\leq 30$ g of binder formed from the sum total of the total amounts of polymer A, crosslinker B and isocyanate C (reckoned as solids) are used per 100 g of granular and/or fibrous substrate. The treatment of the granular and/or fibrous substrates is familiar to a person skilled in the art and is effected for example by drenching or spraying the granular and/or fibrous substrates.

After the treatment with the binder, the granular and/or fibrous substrate is optionally brought into the desired shape, for example by introduction into a heatable press or mold. Subsequently, the shaped granular and/or fibrous substrate is dried and cured in a manner familiar to a person skilled in the art.

Drying and curing the optionally shaped granular and/or fibrous substrate is frequently effected in two temperature stages, of which the drying stage takes place at a temperature $<100°$ C., preferably $\geq 20°$ C. and $\leq 70°$ C. and more preferably $\geq 30$ and $\leq 50°$ C. and the curing stage takes place at a temperature $\geq 100°$ C., preferably $\geq 130$ and $\leq 250°$ C. and more preferably $\geq 160$ and $\leq 220°$ C.

The drying stage advantageously takes the form of drying at a temperature $<100°$ C. until the binder-treated and optionally shaped granular and/or fibrous substrate, which frequently has yet to acquire its ultimate shape (and hence is referred to as a blank or intermediate article), has a residual moisture content $\geq 5\%$ and $\leq 20\%$ by weight. This residual moisture content is determined by first weighing a sample (about 1 g) of the resulting blank at room temperature, then drying it at 130° C. for 2 minutes and subsequently cooling it and reweighing it at room temperature. The residual moisture content of the blank is equal to the weight difference of the sample before and after drying at 130° C., based on the weight of the sample before drying, multiplied by a factor of 100.

The blank obtained in this way is still formable after heating to a temperature $<100°$ C., preferably $\geq 20°$ C. and $\leq 90°$ C. and more preferably $\geq 40$ and $\leq 90°$ C., and can be brought at this temperature into the ultimate shape of the shaped article desired.

The subsequent curing stage advantageously takes the form of the blank (the blank and the ultimate shaped article have the same shape) being heated at a temperature $\geq 100°$ C. until it has a residual moisture content $\leq 1\%$ by weight, preferably $\leq 0.5\%$ by weight and more preferably $\leq 0.1\%$ by weight, in the course of which the binder cures as a result of a chemical esterifying reaction.

When the blank and the shaped article of the present invention do not have the same shape, the shaped article of the present invention is advantageously produced by the blank being brought, in a molding press in the aforementioned temperature ranges, into the final shape and being cured thereafter.

But it is also possible, as will be appreciated, for the drying stage and the curing stage of the shaped articles to take place in one operation, for example in a molding press at a temperature $\geq 100°$ C.

The shaped articles obtainable by the process of the present invention have advantageous properties, more particularly an improved modulus of elasticity or a reduced water absorption compared with the shaped articles of the prior art. Furthermore, producing shaped articles in molding presses in a manner according to the present invention requires little if any release or demolding agent.

The examples which follow, which illustrate the invention, are nonlimiting.

EXAMPLES

I) Materials

The following components were used:

Substrate:
sprucewood wood fibers having a length of 2 to 6 mm and a residual moisture content of 4% by weight.

Polymer A:
a) acrylic acid-maleic anhydride copolymer A1 (acrylic acid/maleic anhydride weight ratio=65:35; weight average molecular weight Mw: 12 800 g/mol)
b) acrylic acid-styrene copolymer A2 (acrylic acid/styrene weight ratio=87:13; weight average molecular weight Mw: 19 100 g/mol)

Crosslinker B:
triethanolamine (purity content ≥99.5% by weight from BASF SE)

Isocyanate C:
mixture of monomeric diphenylmethane diisocyanates and polynuclear homologs of diphenylmethane diisocyanate (Lupranat® M70R; product from BASF Urethanes)

Copolymers A1 and A2 were used to prepare at 20 to 25° C. (room temperature), together with triethanolamine and deionized water, homogeneous aqueous mixtures comprising 39% by weight of copolymer A1, 11% by weight of triethanolamine and 50% by weight of deionized water (binder mixture 1) and, respectively, 42% by weight of copolymer A2, 8% by weight of neopentyl glycol and 50% by weight of deionized water (binder mixture 2).

II) Production of Shaped Articles

A Lödige plowshare mixer having a useful capacity of 35 liters was initially charged with 1000 g of the sprucewood wood fibers at room temperature and switched on. Then, 167 g of one of the two binder mixtures were continuously metered in via a nozzle during 10 minutes, followed by mixing for 5 minutes. The nozzle was changed and 20 g of the aforementioned isocyanate C were then continuously added during 10 minutes. The coated sprucewood wood fibers obtained with the different binder mixtures 1 and 2 are respectively referred to as wood fiber mixture 1 and wood fiber mixture 2.

The procedure described above was repeated to produce two further wood fiber mixtures except that instead of 167 g of the binder mixtures 1 and 2 being added during 10 minutes altogether 207 g of binder mixtures 1 and 2 were continuously added during 20 minutes, and no isocyanate C was added. The coated sprucewood wood fibers thus obtained are referred to as wood fiber mixture C1 and wood fiber mixture C2 respectively (C=comparative).

The procedure for producing the wood fiber mixtures 1 and 2 was exactly repeated to produce two further wood fiber mixtures except that instead of 167 g of the binder mixtures 1 and 2 in each case 167 g of a 50% by weight aqueous solution of copolymer A1 or, respectively, copolymer A2 were used. The coated sprucewood wood fibers thus obtained are referred to as wood fiber mixture C3 and wood fiber mixture C4, respectively.

A further test was carried out by again initially charging 1000 g of the sprucewood wood fibers and then continuously adding, during 20 minutes, only altogether 40 g of the aforementioned isocyanate C with homogeneous mixing. No binder mixture 1 and no binder mixture 2 was added. The coated sprucewood wood fibers obtained are referred to as wood fiber mixture C5.

Of each of the resulting wood fiber mixtures 1 and 2 and also C1 to C5 a 90 g portion was weighed out and uniformly distributed into a 20×20 cm mold of a heatable press (WKP 600/3.5/3, from Wickert, Germany). Next the mold was closed and the shaped wood fiber mixtures 1 and 2 and also C1 to C5 were compressed at a given temperature of 130° C., 160° C. or 200° C. and a pressure of 50 bar (overpressure) down to a thickness of 2 mm and left in the molding press for a period of 60 seconds. The wood fiber plates obtained are named according to the wood fiber mixture used, as wood fiber plates 1 and 2 and also C1 to C5. It is significant that wood fiber plates C5 were stuck to the molding press and were difficult to demold therefrom, whereas the wood fiber plates 1 and 2 and also C1 to C4 were straightforwardly removed from the molding press. Therefore, the production of the wood fiber plates with the wood fiber mixture C5 was repeated except that the molding press was lined with a 0.25 mm thick Teflon sheet before being filled with the wood fiber mixture C5. After molding, the still hot wood fiber plates 1 and 2 and also C1 to C5 were allowed to cool down in a desiccator under reduced pressure (10 mbar absolute) to room temperature. Next the 20×20 cm wood fiber plates 1 and 2 and also C1 to C5 were removed from the desiccator and sawn into approximately 5×5 cm wood fiber platelets 1 and 2 and also C1 to C5. Water absorption was determined for each of these wood fiber platelets.

III) Determination of Water Absorption

To determine water absorption, the approximately 5×5 cm wood fiber platelets 1 and 2 and also C1 to C5 were freed of adherent dust, weighed ($M_{dry}$) and immersed by means of a metal wire basket at 23° C. in deionized water in a water basin for a period of 2 hours or 24 hours. Thereafter, the wood fiber platelets were removed from the water basin, adherent water was removed by a dry cotton cloth before weighing ($M_{wet}$). Water absorption WA (in % by weight) is obtained from the weight difference of the wood fiber platelets before and after water storage, multiplied by 100, divided by the weight of the wood fiber platelets before drying [$WA=(M_{wet}-M_{dry})\times100/M_{dry}$]. In each case, 4 measurements were carried out. The values reported below in Table 1 are the averages of these 4 measurements.

TABLE 1

Determination of water absorption

| | Water absorption | | | | | |
|---|---|---|---|---|---|---|
| Wood fiber | after 2 hours [wt %] Molding temperature | | | after 24 hours [wt %] Molding temperature | | |
| platelets | 130° C. | 160° C. | 200° C. | 130° C. | 160° C. | 200° C. |
| 1 | 95 | 28 | 15 | 196 | 79 | 40 |
| 2 | 170 | 101 | 20 | 192 | 112 | 52 |
| C1 | 603 | 61 | 39 | 631 | 74 | 50 |
| C2 | 495 | 119 | 40 | 546 | 127 | 63 |
| C3 | 213 | 57 | 34 | 243 | 103 | 69 |
| C4 | 309 | 137 | 42 | 337 | 145 | 73 |
| C5 | 32 | 28 | 24 | 81 | 78 | 61 |

As is clearly apparent from the results, the wood fiber platelets 1 and 2, produced using the binder mixtures of the present invention, have the lowest water absorptions compared with the corresponding wood fiber platelets C1 to C4, irrespective of the temperature of the molding operation. By contrast, the wood fiber platelets C5 produced at a molding temperature of 130° C. and 160° C., had distinctly lower water absorptions compared with the corresponding water absorptions of wood fiber platelets 1 and 2, whereas the wood fiber platelets 1 and 2 produced at a molding temperature of 200° C. from the binder mixtures according to the present invention had a distinctly lower water absorption than the wood fiber platelets C5. In addition, the wood fiber plates 1 and 2 were straightforward to remove from the molding press, whereas the wood fiber plates C5 became stuck to the molding press at every one of the molding temperatures used, so that a thin Teflon film had to be inserted between the wood fiber mixture C5 and the mold.

US Provisional/Patent Application No. 61/348,746, filed May 27, 2010, is incorporated in the present application by reference. Numerous modifications and variations of the present invention are possible in light of the above teachings. It is therefore to be understood that within the scope of the appended claims, the invention may be practiced otherwise than as specifically described herein.

I claim:

1. A binder, comprising:
 a polymer A obtained by a process comprising a free-radical addition polymerization,
 a crosslinker B which is an organic compound comprising at least two functional groups selected from the group consisting of a hydroxyl group, an epoxy group, a primary amino group, and a secondary amino group, and
 an isocyanate C which is an organic compound comprising at least two isocyanate groups,
 wherein the polymer A consists of, in polymerized form:
 from 5% to 100% by weight of at least one monomer A1, which is at least one ethylenically unsaturated $C_3$ to $C_6$ mono- or dicarboxylic acid, and
 from 0% to 95% by weight of at least one monomer A2, which is at least one other ethylenically unsaturated compound which is copolymerizable with the at least one monomer A1.

2. The binder according to claim 1 wherein the polymer A is dissolved or dispersed in an aqueous medium.

3. The binder according to claim 1, wherein the polymer A consists of, in polymerized form:
 from 70% to 100% by weight of the at least one monomer A1, and
 from 0% to 30% by weight of the at least one monomer A2.

4. The binder according to claim 1, wherein the polymer A consists of, in polymerized form:
 from 85% to 100% by weight of at least one selected from the group consisting of acrylic acid, methacrylic acid, maleic acid, maleic anhydride, and itaconic acid, and
 from 0% to 15% by weight of at least one selected from the group consisting of methyl acrylate, ethyl acrylate, n-butyl acrylate, 2-ethyl hexyl acrylate, methyl methacrylate, and styrene.

5. The binder according to claim 1, wherein the crosslinker B is triethanolamine.

6. The binder according to claim 1, wherein the isocyanate C is diphenylmethane diisocyanate, a more highly nuclear homolog of diphenylmethane diisocyanate, or both.

7. The binder according to claim 1, wherein a weight ratio of the polymer A to the crosslinker B is in a range from 100:1 to 1:3.

8. The binder according to claim 1, wherein a weight ratio of a sum of the polymer A and the crosslinker B to the isocyanate C is from 20:1 to 1:20.

9. A process for producing a shaped article from a granular substrate, a fibrous substrate, or a granular and fibrous substrate, the process comprising:
 applying the binder according to claim 1 to a granular substrate, a fibrous substrate, or a granular and fibrous substrate, thereby obtaining a binder-treated substrate,
 optionally shaping the binder-treated substrate, and then
 thermally treating the binder-treated substrate at a temperature of at least 100° C.

10. The process according to claim 9, further comprising:
 mixing the polymer A, the crosslinker B or a mixture of the polymer A and the crosslinker B with the isocyanate C, thereby obtaining the binder, immediately before or during the applying to the substrate.

11. The process according to claim 9, wherein, in the applying, at least 0.1 g and at most 100 g of binder, defined as a sum total of the polymer A, the crosslinker B, and the isocyanate C, based on solids, is applied per 100 g of the substrate.

12. The process according to claim 9, wherein the thermally treating consists of a drying and a curing.

13. The process according to claim 9, wherein the substrate comprises cellulose.

14. The process according to claim 9, wherein the substrate comprises lignocellulose.

15. A shaped article obtained by the process according to claim 9.

* * * * *